UNITED STATES PATENT OFFICE.

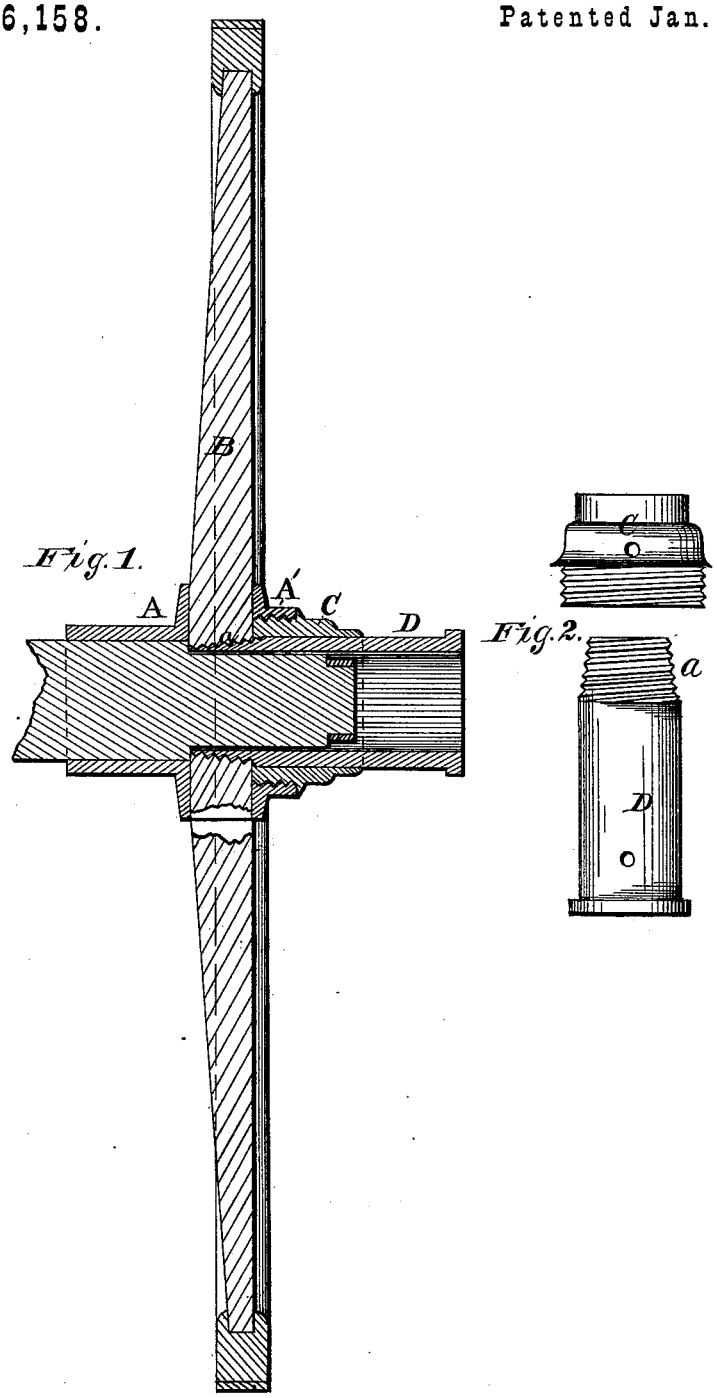

ALVAH A. PHILBRICK, OF COLDWATER, MICHIGAN.

IMPROVEMENT IN VEHICLE-WHEELS.

Specification forming part of Letters Patent No. 186,158, dated January 9, 1877; application filed November 8, 1876.

*To all whom it may concern:*

Be it known that I, ALVAH A. PHILBRICK, of Coldwater, in the county of Branch and State of Michigan, have invented certain new and useful Improvements in Wheels for Vehicles; and I do hereby declare that the following is a full, clear, and exact description thereof, reference being had to the accompanying drawings and to the letters of reference marked thereon, which form part of this specification.

My invention relates to wheels for vehicles; and it consists in the construction and arrangement of the devices for tightening the spokes and the tire, as will be hereinafter more fully set forth.

In order to enable others skilled in the art to which my invention appertains to make and use the same, I will now proceed to describe its construction and operation, referring to the annexed drawing, in which—

Figure 1 is a vertical section of a wheel for vehicles embodying my invention. Fig. 2 shows detailed views of parts thereof.

A represents the metallic hub formed with separate and independent mortises for the reception of the spokes B B.

The outer end of the hub is made of larger interior diameter, as shown at A', than the inner end, sufficient to receive a screw ring or thimble, C, the inner end of which, when the ring is screwed up, bears against and holds the spokes firmly in the hub. Through the ring or collar C is passed an elongated tubular thimble, D, the inner end, a, of which is made tapering, and provided with exterior screw-threads. This thimble is screwed into the circle formed by the inner ends of the spokes B, and the screw end a of said thimble being tapering, the spokes are forced outward, thus tightening the tire. When the tire has been tightened in this manner the collar C is screwed up to fasten the spokes in the hub.

Having thus fully described my invention, what I claim as new, and desire to secure by Letters Patent, is—

The combination of the hub A with enlargement A' and spokes B B, the screw ring or collar C and the tubular thimble D, having tapering screw end a for screwing under and forcing outward the spokes, all substantially as and for the purposes herein set forth.

In testimony that I claim the foregoing as my own I affix my signature in presence of two witnesses.

ALVAH A. PHILBRICK.

Witnesses:
WM. H. DONALDSON,
GEORGE GREENWOOD.